US00RE42383E

(19) United States
(12) Reissued Patent
Wassenhoven et al.

(10) Patent Number: US RE42,383 E
(45) Date of Reissued Patent: May 24, 2011

(54) OPEN-END SPINNING FRAME

(75) Inventors: Heinz-Georg Wassenhoven, Monchengladbach (DE); Claus-Dieter Landolt, Monchengladbach (DE)

(73) Assignee: Oerlikon Textile GmbH & Co. KG, Monchengladbach (DE)

(21) Appl. No.: 10/682,853

(22) Filed: Oct. 9, 2003

Related U.S. Patent Documents

Reissue of:
(64) Patent No.: 6,298,649
Issued: Oct. 9, 2001
Appl. No.: 09/716,758
Filed: Nov. 20, 2000

(30) Foreign Application Priority Data

Nov. 20, 1999 (DE) ..... 199 55 829

(51) Int. Cl.
*D01H 4/00* (2006.01)
(52) U.S. Cl. ..... 57/406; 57/404
(58) Field of Classification Search ..... 57/404, 57/406; 310/90.5; 384/446
See application file for complete search history.

(56) References Cited

U.S. PATENT DOCUMENTS 3,747,998 A * 7/1973 Klein et al. ..... 310/90.5
3,934,950 A * 1/1976 Kuhlmann ..... 57/93
4,106,192 A * 8/1978 Stahlecker ..... 384/610
4,167,845 A * 9/1979 Munnich et al. ..... 57/104
4,371,218 A * 2/1983 Ichikawa ..... 310/90.5
5,622,040 A * 4/1997 Preutenborbeck et al. ..... 57/406
5,710,469 A 1/1998 Ries ..... 310/90.5
5,887,417 A * 3/1999 Derichs ..... 57/406
5,987,871 A * 11/1999 Winzen ..... 57/406

FOREIGN PATENT DOCUMENTS

AT 270 459 4/1969
AT 270459 4/1969
AT 270459 A * 4/1969
DE 2206237 8/1973
DE 2206237 A * 8/1973
DE 2248695 4/1974
DE 2248695 A * 4/1974

(Continued)

OTHER PUBLICATIONS

German Search Report.

*Primary Examiner* — Danny Worrell
(74) *Attorney, Agent, or Firm* — K&L Gates LLP

(57) ABSTRACT

An open-end spinning frame [(1)] having a spinning rotor [(3)], whose rotor shaft [(4)] is supported, free of axial thrust, in the bearing wedge of a support disk bearing arrangement [(5)] and is fixed in place by means of a magnetic axial bearing [(18)]. The axial bearing [(18)] has a stationary magnetic bearing component [(27)] fixed on the bearing housing [(26)], and a rotating magnetic bearing component [(44)] arranged at the end of the rotor shaft and having at least two annular shoulders [(46)] defined by recesses [(47)] in the rotor shaft [(4)]. The sharpness of the annular shoulders [(46)] is reduced in the area between their outer circumference [(58)] and the adjoining radial faces [(50)] of each annular shoulder, e.g., via curved or beveled surfaces in such area, and the base surfaces [(49)] of the recesses [(47)] are each connected via rounded sections [(51)] with the radial faces [(50)] of the adjoining annular shoulders [(46)].

65 Claims, 3 Drawing Sheets

FOREIGN PATENT DOCUMENTS

| | | | | | |
|---|---|---|---|---|---|
| DE | 25 147 34 | | | 10/1976 | |
| DE | 2514734 | A | * | 10/1976 | |
| DE | 2634070 | | | 2/1978 | |
| DE | 2634070 | A | * | 2/1978 | |
| DE | 30 47 606 | A1 | | 9/1981 | |
| DE | 3047606 | | * | 9/1981 | ..... 57/406 |
| DE | 3047606 | A | * | 9/1981 | |
| DE | 4022562 | | | 1/1992 | |
| DE | 4022562 | A | * | 1/1992 | |
| DE | 4436831 | | | 6/1995 | |
| DE | 4436831 | A1 | * | 6/1995 | |
| DE | 195 42 079 | A1 | | 6/1996 | |
| DE | 19542079 | A1 | * | 6/1996 | |
| DE | 197 29 191 | A1 | | 1/1999 | |
| DE | 19729191 | A1 | * | 1/1999 | |
| DE | 198 22 587 | A1 | | 11/1999 | |
| DE | 19822587 | A1 | * | 11/1999 | |
| DE | 199 10 279 | | | 9/2000 | |
| DE | 199 10 279.1 | | | 9/2000 | |
| DE | 19910279 | A1 | * | 9/2000 | |

* cited by examiner

OPEN-END SPINNING FRAME

Matter enclosed in heavy brackets [ ] appears in the original patent but forms no part of this reissue specification; matter printed in italics indicates the additions made by reissue.

CROSS-REFERENCES TO RELATED APPLICATIONS

This application claims the benefit of German patent application DE P 19955829.9, filed Nov. 20, 1999, herein incorporated by reference.

FIELD OF THE INVENTION

The present invention relates to an open-end spinning frame having a spinning rotor with a rotor shaft supported so as to be free of axial thrust in a wedge-like bearing area formed between adjacent pairs of support disks and held in place therein by a magnetic axial bearing having a stationary magnetic bearing component fixed in a bearing housing and a rotating magnetic bearing component arranged at the end of the rotor shaft and formed by at least two annular ferromagnetic shoulders which are constituted by recesses in the rotor shaft.

BACKGROUND OF THE INVENTION

Spinning units are known in open-end rotor spinning frames wherein the rotor shaft of the spinning rotor, which typically revolves at a high number of revolutions, is supported in the wedge-like bearing area of a support disk bearing arrangement and is fixed in place by means of a mechanical axial bearing arranged at the end of the shaft. Here, the support disk bearing arrangement comprises two pairs of support disks disposed adjacent one another to define the bearing wedge area therebetween, with the axes of the support disks offset such that an axial thrust is exerted on the rotor shaft to constantly urge the rotor shaft against the mechanical axial bearing arranged at its end.

This type of seating of open-end spinning rotors which, for example, is described in German Patent Publication DE-OS 25 14 734, has proven itself in actual use and makes it possible for the spinning rotors to achieve rotational speeds of greater than 100,000 rpm.

However, because of the offset of the support disks, this type of seating of spinning rotors suffers the disadvantage of increased friction occurring between the bearing surfaces of the support disks and the rotor shaft, which over time leads to heating of the bearing surfaces of the support disks. Not only are the bearing surfaces of the support disks considerably stressed by this frictional heating, but additional energy is also required to overcome this friction. Moreover, the mechanical axial bearings are subjected to not inconsiderable wear, even when properly lubricated.

Therefore attempts have already been made in the past to replace these mechanical axial bearings with wear-resistant magnetic bearings. An axial magnetic bearing arrangement is described in DE 195 42 079 A1, wherein one magnetic bearing element is stationarily fixed in a housing of the axial bearing, and another magnetic bearing element or elements are releasably arranged on the rotor shaft of the spinning rotor. Different variations are proposed in this reference regarding the attachment to the rotor shaft of the magnetic bearing elements so as to thereby rotate integrally with the spinning rotor.

Some of these proposals relate to a frictional fitting of the co-rotating magnetic bearing elements on the shaft, while other proposals relate to an interlocking connection of the co-rotating magnetic bearing elements, which can be easily released if required. Although a correct axial fixation of the rotor shaft on the support disk bearing arrangement is possible with these known magnetic bearing elements, and although it is furthermore assured that the spinning rotor can be installed and removed without problems when required, it has been shown that the frictional connection of the magnetic bearing component with the rotor shaft, which is basically advantageous in that it can be easily released when required, is still capable of improvements. The fastening of the co-rotating magnetic bearing elements on the rotor shaft is particularly problematical in connection with such magnetic bearing devices, because the high number of revolutions of the spinning rotor places great demands on the balancing quality of this connection.

An open-end rotor spinning arrangement with a permanent magnet axial bearing has also become known from Austrian Letters Patent 270 459. In this bearing arrangement, ferromagnetic annular shoulders are arranged at the end of the rotor shaft of a spinning rotor, and pole shoes of a permanent magnet, which is pivotably seated in this area, are placed opposite the annular shoulders. The bundling of the magnetic lines of force of the permanent magnet, which becomes possible by means of such an arrangement, leads to a relatively stiff fixation of the rotor shaft in the bearing wedge of the support disk bearing arrangement.

However, this type of magnetic bearing arrangement has the disadvantage that the annular shoulders arranged on the rotor shaft clearly have a larger diameter than the rotor shaft itself. Since the larger diameter annular shoulders make considerably more difficult or even prevent the installation and removal of the spinning rotor, in particular the mounting of its front, this known magnetic bearing arrangement has been unable to gain acceptance in actual use.

Furthermore, a bearing for a spindle of a textile machine, which rotates at a relatively high number of revolutions, is known from German Patent Publication DE 30 47 606 A1. Here, the spindle is supported in the radial direction by means of a three-point bearing arrangement similar to a support disk bearing, and the spindle is secured in the axial direction by means of a magnetic bearing. At its end, the spindle has a bearing area with a reduced diameter and with two ferromagnetic annular shoulders. A bushing made of a non-magnetic material is fixed in place on the bearing housing, and a ring-shaped permanent magnet element, which is enclosed in lateral pole disks, has been embedded in it. In the installed state of the spindle, the ferromagnetic annular shoulders of the spindle shaft are located opposite the pole disks of the permanent magnet element fixed in the static bearing element. Although this known embodiment permits a relatively problem-free installation and removal of the spindle in the axial direction, this arrangement has not been able to gain acceptance in actual use because of its lack of axial bearing rigidity.

Moreover, other bearings for spinning rotors are known from German Patent Publication DE 197 29 191 A1, or the later published German Patent Publication DE 199 10 279.1, wherein the shaft of the rotor is supported without axial thrust in the bearing wedge of a support disk bearing and is axially fixed in place by means of an axial bearing. In this case the axial bearing has a stationary magnetic bearing component, which can be fixed in place on the bearing housing, and a rotatably arranged magnetic bearing component constituted by ferromagnetic annular shoulders in the area of the end of the rotor shaft. Here, the annular shoulders are constituted by recesses in the rotor shaft, which are subsequently filled with a non-magnetic filler material. In this manner, it is intended to avoid the danger that a coating on the peripheral running surfaces of the support disks might be damaged by sharp-edges of the annular shoulders during the installation or removal of the spinning rotor.

In accordance with German Patent Publication DE 197 29 191 A1, plastic is provided as the filler material but without completely satisfactory results because, at the high speed of rotation of the spinning rotor, the plastic material has a tendency to "flow" after extended periods of operation, which results in an unacceptable imbalance of the spinning rotor.

Although these difficulties could be prevented by filling the recesses with a non-magnetic metallic material as described in German Patent Publication DE 199 10 279.1, this filling of these recesses, for example with copper, can lead to an accumulation of material outside of the bearing area of the rotor shaft, which had a negative effect on the natural oscillation behavior of the spinning rotor, in particular at numbers of revolutions clearly above 100,000 $min^{-1}$.

SUMMARY OF THE INVENTION

It is therefore an object of the present invention to further improve the known open-end spinning devices described above and to overcome the disadvantages thereof.

The present invention is basically adapted to any open-end spinning frame of the type having a spinning rotor, a rotor shaft fixed coaxially with the spinning rotor, a support disk bearing arrangement defining a bearing wedge for supporting therein the rotor shaft without imposing axial thrust thereon, and a magnetic axial bearing having a bearing housing, a stationary magnetic bearing component fixed in the bearing housing, and a rotating magnetic bearing component arranged at the end of the rotor shaft. In accordance with the present invention, the aforestated object is attained by forming the rotating magnetic bearing component to comprise at least two ferromagnetic annular shoulders defined by adjacent recesses in the rotor shaft, wherein each annular shoulder has opposed radial faces and a generally rounded outer circumference extending therebetween and each recess has a base circumference connected via rounded annular surfaces with the radial surfaces of the adjacent annular shoulders. In this manner, the annular shoulders have no sharp edges so that the relatively sensitive running surfaces of the support disks are not damaged in the course of installing and removing the spinning rotor. Furthermore, the present invention provides the advantage of minimizing the portion of weight of the rotor shaft projecting past the location of the support disk bearing arrangement.

In a preferred embodiment, the ratio of the length of the rotor shaft to the diameter of the rotor shaft is less than about 12:1, preferably about 11.33:1, which makes it possible to further optimize the spinning rotor such that at high rotational speeds, especially at revolutions greater than 130,000 rpm, the rotor remains outside of its critical natural frequency.

The rotor shaft advantageously has a length greater than about 100 mm, preferably a length of about 93.5 mm. This length is noticeably shortened in comparison with the customary length of conventional rotor shafts, which essentially is due to the area of the magnetic bearing components of the rotor shaft, and advantageously raises the critical natural frequency of the spinning rotor to a level of revolutions which also provides room for further developments.

Thus, the critical natural frequency of the spinning rotor in accordance with the invention lies at a number of revolutions which is clearly above the number of revolutions of rotors which can be expected in the foreseeable future.

In order to preserve the sensitive circumferential running surfaces of the support disks, the general rounding of the annular shoulders reduces substantially the presence of sharp edges in the peripheral areas of the shoulders. For example, the rounding of the shoulders may be accomplished by forming the rounded circumference with curved sections or bevels. On the one hand, such designs assure in a simple manner that the circumferential running surfaces of the support disks are not damaged in the course of the installation or removal of the spinning rotor and, on the other hand, the relatively small curved sections or bevels do not result in any appreciable disruption of the magnetic flux of the axial bearing. For example, the rounded sections arranged on the annular shoulders are of a size of between about 0.1 mm to about 0.5 mm, preferably 0.3 mm.

The curved sections provided in the region of the transitions between the base surfaces of the recesses and the adjoining radial shoulder faces also minimize the danger of breaking of the rotor shaft when turning at high rotational speeds, and in particular remove any possible notching effect in the area of the annular shoulders and recesses. Each of these curved sections has a size of between 0.2 and 1.5 mm, preferably 0.7 mm.

It is additionally preferred that a mechanical emergency bearing be arranged inside the magnetic axial bearing. This emergency bearing is comprised at least partially of a highly wear-resistant ceramic material, for example a ceramic pin, which is inserted into a bore of the bearing bushes of the axial bearing. In this case, the ceramic pin acts together with a contact surface, for example the front face of the rotor shaft, arranged at a distance. Thus, during "normal" spinning operations the stationary ceramic pin does not rest against its oppositely rotating bearing element and, therefore, no additional friction occurs. However, in case of a failure, the emergency bearing prevents the magnetic bearing components from coming into direct physical contact, which would lead to considerable damage of the axial bearing.

Further details, features and advantages of the present invention will be understood from the following disclosure of exemplary embodiments with reference to the accompanying drawings.

DETAILED DESCRIPTION OF THE PREFERRED EMBODIMENT

Figure 1:
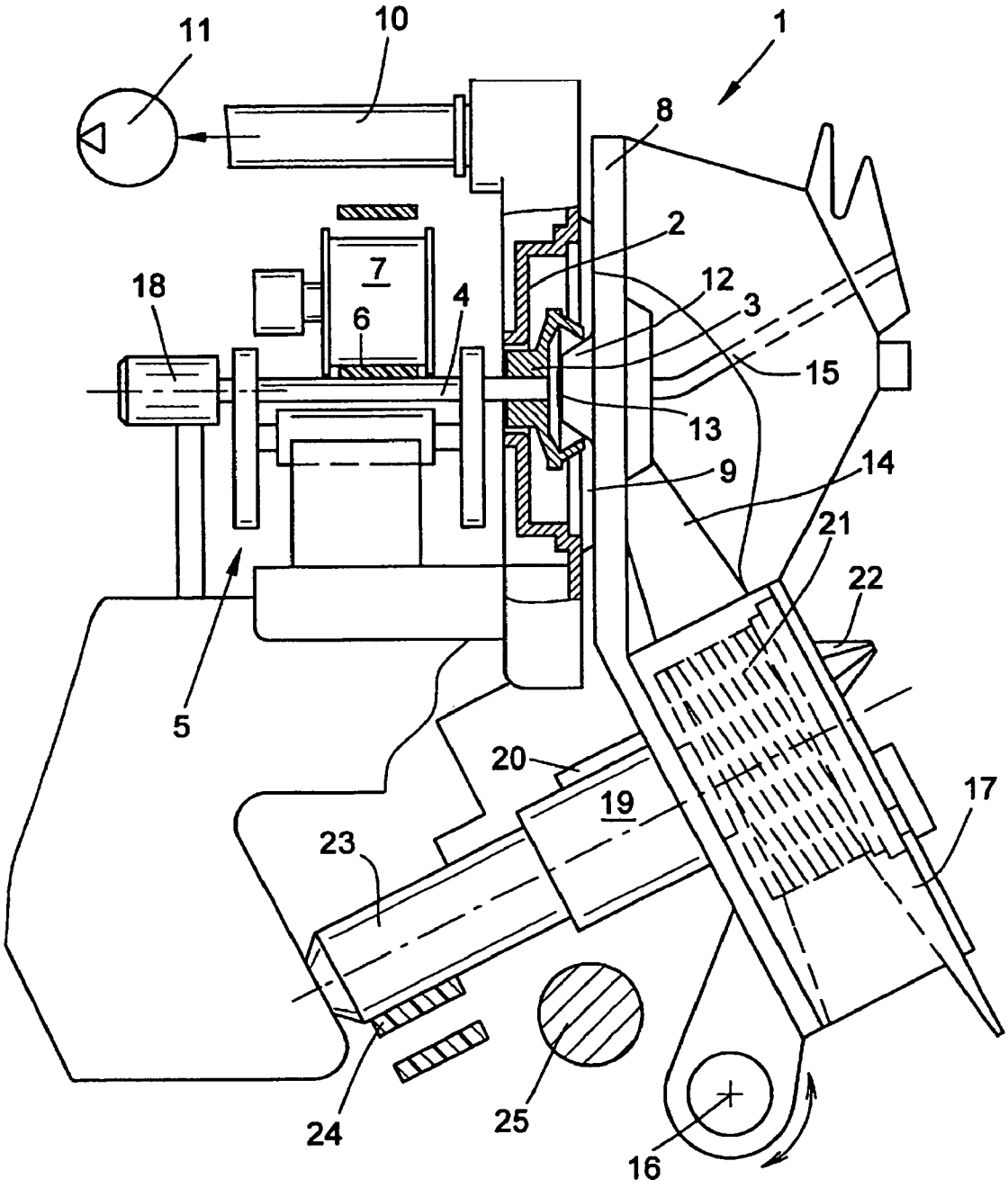
FIG. 1 is a schematic side elevational view of an open-end spinning frame in accordance with the present invention, with the rotor shaft of its spinning rotor supported, free of axial thrust, in the bearing wedge of a support disk bearing, and fixed in place at its end by means of a magnetic axial bearing.

Referring now to the accompanying drawings and initially to FIG. 1, an open-end spinning unit is identified as a whole by the reference numeral 1. In a known manner, the spinning unit has a rotor housing 2, in which the spinning cup of a spinning rotor 3 rotates at a high number of revolutions. The spinning rotor 3 is integrally mounted coaxially to a rotor shaft 4 supported in the bearing wedge of a support disk bearing arrangement 5, and is driven peripherally by a tangential belt 6 extending over the length of the machine and held frictionally against the shaft 4 by a contact roller 7. The rotor shaft 4 is axially fixed by means of a permanent magnet axial bearing 18, shown in detail in FIGS. 2 and 3.

As is customary, the rotor housing 2 is open toward its front and is closed during operation by a pivotably seated cover element 8, into which a channel plate (not shown in detail) with a seal 9 has been cut. The rotor housing 2 is also connected via an appropriate aspirating line 10 to a suction source 11, which generates the underpressure required in the rotor housing 2.

A channel plate adapter 12 is arranged in the cover element 8, which holds a yarn withdrawal nozzle 13 as well as the mouth area of a fiber guide conduit 14. A small yarn withdrawal tube 15 follows the yarn withdrawal nozzle 13. In addition, an opening roller housing 17 is fixed in place on the cover element 8, which is seated so that it is pivotable to a limited extent around a pivot shaft 16. On its rear, the cover element 8 additionally has bearing brackets 19, 20 for seating an opening roller 21 or a sliver draw-in cylinder 22. In the area of its wharve 23, the opening roller 21 is driven by a circulating tangential belt 24 extending over the length of the machine, while the drive mechanism (not represented) of the sliver draw-in cylinder 22 preferably is provided via a worm gear arrangement, which is connected with a drive-shaft 25 extending over the length of the machine.

Figure 2:
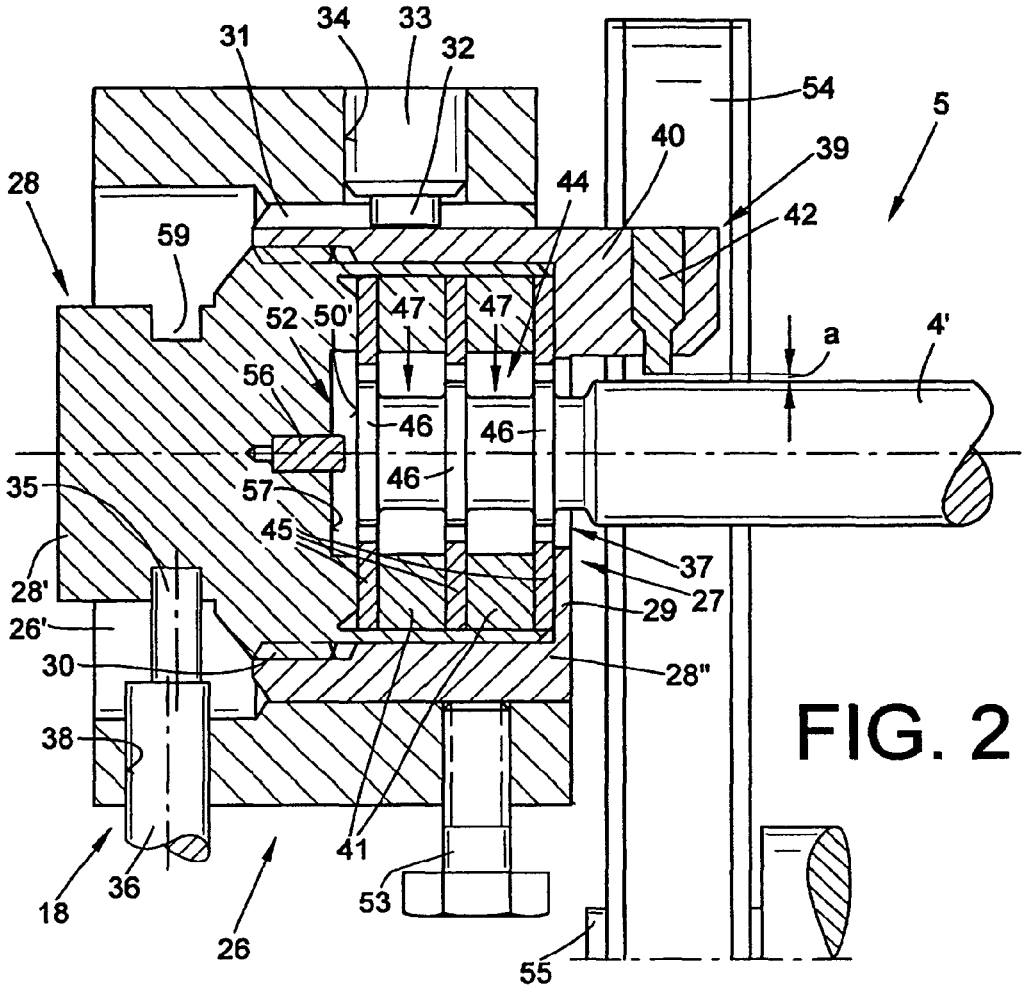
FIG. 2 is an enlarged view, partially in side elevation and partially in cross-section, of the axial bearing of FIG. 1, with the end area of the rotor shaft having a magnetic bearing component designed in accordance with the present invention.

FIG. 2 shows the axial bearing 18 in accordance with the present invention in detail in a sectional view. Only a support disk 54 with its shaft 55 of the support disk bearing 5 is represented in FIG. 2. A corresponding pair of support disks is arranged, spaced apart, in the vicinity of the spinning cup of the spinning rotor 3, as can be seen in FIG. 1.

The magnetic axial bearing 18 comprises an essentially stationary magnetic bearing component 27, which is supported in a bearing housing 26 and can be axially adjusted. The active bearing components in the form of permanent magnet rings 41 with pole rings 45 respectively arranged on both sides are arranged within a two-piece bearing bushing 28, comprised of an inner bushing 28' and an outer bushing 28". The bearing bushing elements 28' and 28" are screwed together by means of a screw thread 30. The active bearing components 41 and 45 are supported inside the inner bushing 28' and are pressed against an annular shoulder 29 arranged on the outer bushing 28". This results on the one hand in a solid bearing structure, and on the other hand in an unproblematical capability for dismantling the bearing, for example for replacing individual components arranged in the interior of the bearing.

The bearing bushing 28 is seated for axial displaceability within a bore 26' of the bearing housing 26. As a result, it is possible to adjust the stationary magnetic bearing component exactly to achieve an optimal position in accordance with the spinning technology of the spinning cup.

To prevent twisting of the bearing bushing 28 inside the bearing housing 26, a pin 32 of a bolt 33 inserted into a bore 34 engages a longitudinal groove 31 of the bearing bushing 28. The axial adjustment of the static bearing component 27 can be performed in a simple manner by means of a pin 35 of a so-called setting gauge 36, which engages a groove 59 of the bearing bushing 28. For this purpose, the setting gauge 36 is inserted into a bore 38 of the bearing housing 26. The axial position of the static bearing component 27 can be fixed in place by means of a fastening screw 53, which braces the bearing bushing 28 against the bearing housing 26.

The rotatable magnetic bearing component 44 of the rotor shaft 4 can be inserted through an opening in the rotor housing 2, through the bearing wedges of the support disk bearing 5, as well as a bore 37 of the annular shoulder 29, into the stationary magnetic bearing component 27, while the remaining shaft portion 4', which primarily is used for the radial seating of the spinning rotor 3, remains outside of the axial bearing 18.

The magnetic bearing component 44 of the rotor shaft 4 essentially consists of recesses 47, which form disk-like annular shoulders 46 therebetween. The rotor shaft 4 is manufactured of steel with ferromagnetic properties. With the rotor shaft 4 completely inserted into the axial bearing 18, the annular shoulders 46 are in radially opposed facing relationship with the pole disks 45, which are arranged on both sides of the permanent magnet rings 41. Preferably the pole disks 45 have the same width as the annular shoulders 46. In this case, the width of each of the annular shoulders 46 preferably is approximately 1 mm, and the width of each of the recesses 47 is approximately 3 mm.

In addition, a support device 39 is arranged in the area of the axial bearing 18, which has a ceramic pin 42, for example, which has been inserted into a bore of a shoulder 40 of the bearing bushing 28, preferably into the outer bushing 28".

As indicated in FIG. 2, during "normal" spinning operations the ceramic pin 42 is at a spacing a from the rotor shaft 4 revolving at a high number of revolutions, which assures that no friction will occur between the two components.

In case of interruptions in spinning, in particular during rotor cleaning, during which the contact roller 7 with the tangential belt 6 is lifted off the rotor shaft 4 and the spinning rotor 3 is acted upon by a cleaning element arranged in a piecing cart, the support device 39 prevents the rotor shaft 4 from being pivoted in a clockwise direction, based on the radial force component acting on the rotor shaft 4 in the course of this, and that as a result a contact between the magnetic bearing components of the axial bearings 18 could occur.

As can be further seen in FIG. 2, a mechanical emergency bearing 52 is additionally arranged inside the magnetic axial bearing 18. This emergency bearing 52 comprises, as indicated for example in FIG. 2, a ceramic pin 56, which is fixed in place in a bore of the bearing bushing 28 and which in case of emergency acts together with the front face 50' of the rotor shaft 4. Alternatively, as indicated in FIG. 5, the ceramic pin 56 can also be fastened in a bore of the rotor shaft 4 and would then act together with the bottom surface 57 of the bearing bushing 28.

Figure 3:
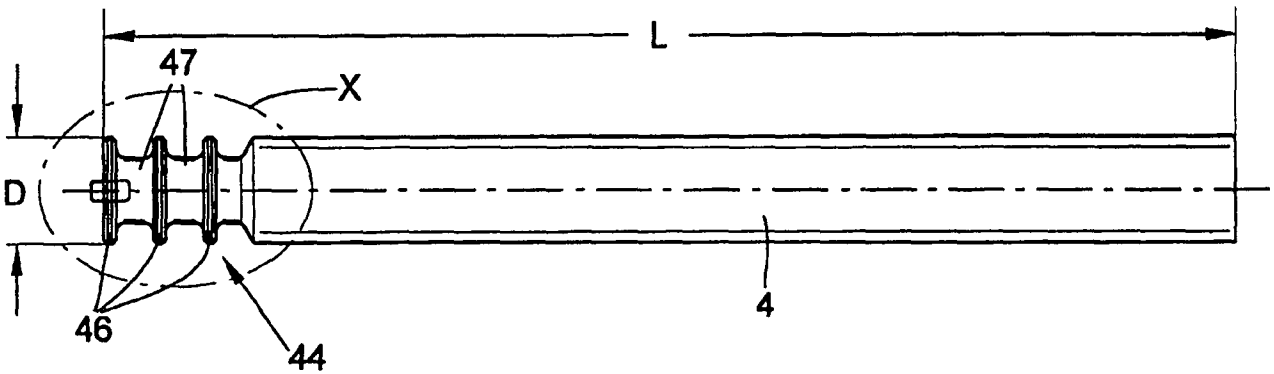
FIG. 3 is a side elevational view of the rotor shaft in accordance with the present invention.

FIG. 3 shows a rotor shaft 4 in a general view. Here, the end of the rotor shaft 4 is equipped with the magnetic bearing component 44 of the present invention as shown in FIG. 2 and described above. In this case, the diameter D of the rotor shaft 4 lies between about 8 mm and 9 mm, preferably 8.25 mm. The length L of the rotor shaft 4 is less than about 100 mm, and preferably is 93.5 mm.

Figure 4:
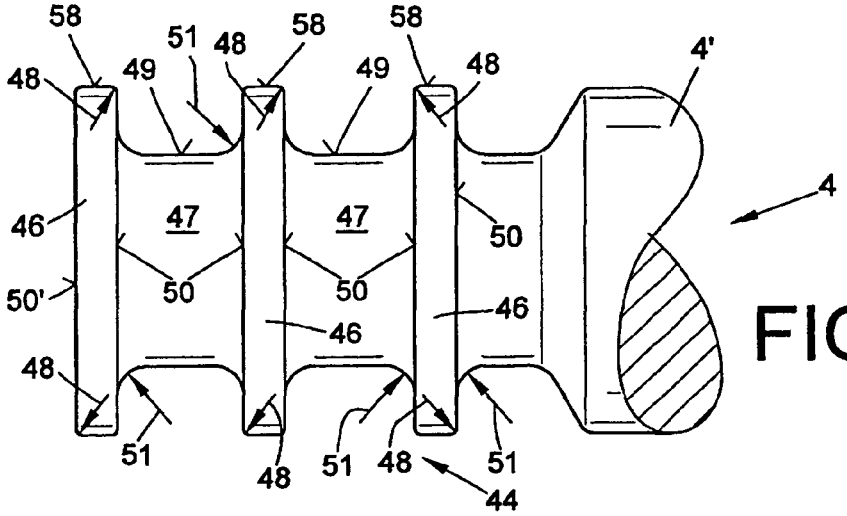
FIG. 4 is an enlarged side elevational view of the rotational magnetic bearing component at the end area of the rotor shaft in accordance with the embodiment of FIG. 2.

The magnetic bearing component 44 is represented in an enlarged scale in FIG. 4, and is comprised of annular shoulders 46, as well as recesses 47 located therebetween. Here, the exterior diameter of the annular shoulders 46 approximately corresponds to the exterior diameter D of the rotor shaft 4, while the diameter of the recesses 47 is clearly less and for example is approximately 5 mm.

Figure 5:
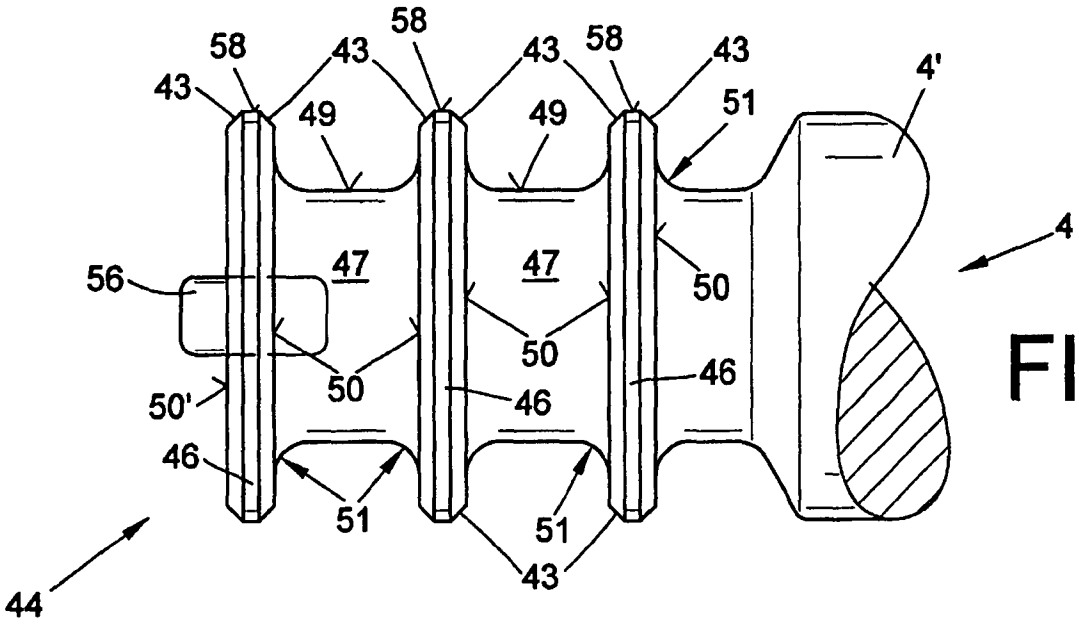
FIG. 5 is another enlarged side elevational view of a rotational magnetic bearing component at the end area of a rotor shaft in accordance with an alternative embodiment of the present invention.

In accordance with the invention, the sharpness of the annular edges of the shoulders 46 is reduced in the area of their outer circumference by rounding the outer annular edges either in the form of a curved sections 48, as represented in FIG. 4, or bevels 43, as indicated in FIG. 5. As can be seen from FIGS. 4 and 5 in, particular, the transitions between the base surfaces 49 of the recesses 47 and the radial faces 50 of the annular shoulders 46 are also rounded. These curved sections identified by 51 are preferably slightly larger than the curved sections 48 in the area of the outer circumference of the annular shoulders 46.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An open-end spinning frame having a spinning rotor, a rotor shaft fixed coaxially with the spinning rotor, a support disk bearing arrangement defining a bearing wedge for supporting therein the rotor shaft without imposing axial thrust thereon, a magnetic axial bearing having a bearing housing, a stationary magnetic bearing component fixed in the bearing housing, and a rotating magnetic bearing component arranged at an end area of the rotor shaft, the rotating magnetic bearing component comprising at least two ferromagnetic annular shoulders defined by adjacent recesses in the rotor shaft, each annular shoulder having opposed radial faces and a generally rounded outer circumference extending therebetween and each recess having a base circumference connected via rounded annular surfaces with the radial faces of the adjacent annular shoulders.

2. The open-end spinning frame in accordance with claim 1, characterized in that the ratio of the length of the rotor shaft to the diameter of the rotor shaft is less than about 12:1.

3. The open-end spinning frame in accordance with claim 1, characterized in that the ratio of the length of the rotor shaft to the diameter of the rotor shaft is about 11.33:1.

4. The open-end spinning frame in accordance with claim 1, characterized in that the rotor shaft has a length of less than about 100 mm.

5. The open-end spinning frame in accordance with claim 1, characterized in that the rotor shaft has a length of about 93.5 mm.

6. The open-end spinning frame in accordance with claim 1, characterized in that the generally rounded outer circumference of each of the annular shoulders comprises curved annular sections extending between an exterior circumferential surface and the adjacent radial faces.

7. The open-end spinning frame in accordance with claim 6, characterized in that each of the curved sections in the area of the exterior circumferential surface has an axial dimension of between about 0.1 mm and about 0.5 mm.

8. The open-end spinning frame in accordance with claim 6, characterized in that each of the curved sections in the area of the exterior circumferential surface has an axial dimension of about 0.3 mm.

9. The open-end spinning frame in accordance with claim 1, characterized in that the generally rounded outer circumference of each of the annular shoulders comprises beveled annular sections extending between an exterior circumferential surface and the adjacent radial faces.

10. The open-end spinning frame in accordance with claim 1, characterized in that the rounded annular surfaces of each recess between the base circumference thereof and the radial faces of the adjacent annular shoulders have a dimension of between about 0.2 mm and about 1.5 mm.

11. The open-end spinning frame in accordance with claim 1, characterized in that the rounded annular surfaces of each recess between the base circumference thereof and the radial faces of the adjacent annular shoulders have a dimension of about 0.7 mm.

12. The open-end spinning frame in accordance with claim 1, characterized in that one radial face of one of the annular shoulders forms a terminal end of the rotor shaft.

13. The open-end spinning frame in accordance with claim 1, characterized further by a mechanical emergency bearing in the end area of the rotor shaft, the emergency bearing having at least one bearing component made of a ceramic material.

14. The open-end spinning frame in accordance with claim 13, characterized in that the one bearing component comprises a ceramic pin.

15. The open-end spinning frame in accordance with claim 14, characterized in that the ceramic pin is fixed in a bore of a bearing bushing of the axial bearing.

16. The open-end spinning frame in accordance with claim 14, characterized in that the ceramic pin is fixed in a bore of the rotor shaft.

*17. A rotor shaft for a spinning rotor of an open-end spinning frame, the rotor shaft comprising:*

*a rotating magnetic bearing component arranged at an end area of the rotor shaft, the rotating magnetic bearing component comprising at least two ferromagnetic annular shoulders defined by adjacent recesses in the rotor shaft, each annular shoulder having opposed radial faces and a generally rounded outer circumference extending therebetween, and each recess having a base circumference connected via rounded annular surfaces with the radial faces of the adjacent annular shoulders.*

*18. The rotor shaft of claim 17, wherein the ratio of the length of the rotor shaft to the diameter of the rotor shaft is less than about 12:1.*

*19. The rotor shaft of claim 17, wherein the ratio of the length of the rotor shaft to the diameter of the rotor shaft is about 11.33:1.*

*20. The rotor shaft of claim 17, wherein the rotor shaft has a length of less than about 100 mm.*

*21. The rotor shaft of claim 17, wherein the rotor shaft has a length of about 93.5 mm.*

*22. The rotor shaft of claim 17, wherein the generally rounded outer circumference of each of the annular shoulders comprises curved annular sections extending between an exterior circumferential surface and the adjacent radial faces.*

*23. The rotor shaft of claim 22, wherein each of the curved sections in the area of the exterior circumferential surface has an axial dimension of between about 0.1 mm and about 0.5 mm.*

*24. The rotor shaft of claim 22, wherein each of the curved sections in the area of the exterior circumferential surface has an axial dimension of about 0.3 mm.*

*25. The rotor shaft of claim 17, wherein the generally rounded outer circumference of each of the annular shoulders comprises beveled annular sections extending between an exterior circumferential surface and the adjacent radial faces.*

*26. The rotor shaft of claim 17, wherein the rounded annular surfaces of each recess between the base circumference thereof and the radial faces of the adjacent annular shoulders have a dimension of between about 0.2 mm and about 1.5 mm.*

*27. The rotor shaft of claim 17, wherein the rounded annular surfaces of each recess between the base circumference thereof and the radial faces of the adjacent annular shoulders have a dimension of about 0.7 mm.*

*28. The rotor shaft of claim 17, wherein one radial face of one of the annular shoulders forms a terminal end of the rotor shaft.*

*29. The rotor shaft of claim 17, further comprising:*

*a mechanical emergency bearing in the end area of the rotor shaft, the emergency bearing having at least one bearing component made of a ceramic material.*

*30. The rotor shaft of claim 29, wherein the at least one bearing component comprises a ceramic pin.*

*31. The rotor shaft of claim 30, wherein the ceramic pin is fixed in a bore of a bearing bushing of the axial bearing.*

*32. The rotor shaft of claim 30, wherein the ceramic pin is fixed in a bore of the rotor shaft.*

*33. A rotor shaft having a rotating bearing component arranged at an end thereof for use in a spinning frame in which the rotor shaft is coaxially fixed to a spinning rotor, a support disk bearing arrangement defines a bearing wedge for supporting the rotor shaft without imposing axial thrust thereon, a magnetic axial bearing having a bearing housing with a stationary magnetic bearing component fixed in the bearing housing, said rotating bearing component comprising at least two ferromagnetic annular shoulders defined by adjacent recesses in the rotor shaft, each annular shoulder having opposed radial faces and a generally rounded out circumference extending therebetween, and each recess having a base circumference connected with the radial faces of the adjacent annular shoulders.*

*34. The rotor shaft of claim 33, wherein each recess of said rotating bearing component has a rounded annular surface connecting said base circumference thereof with the radial faces of the adjacent annular shoulders.*

*35. The rotor shaft of claim 34, wherein the ratio of the length of the rotor shaft to the diameter of the rotor shaft is less than about 12:1.*

*36. The rotor shaft of claim 34, wherein the ratio of the length of the rotor shaft to the diameter of the rotor shaft is about 11.33:1.*

*37. The rotor shaft of claim 34, wherein the rotor shaft has a length of less than about 100 mm.*

*38. The rotor shaft of claim 34, wherein the rotor shaft has a length of about 93.5 mm.*

*39. The rotor shaft of claim 34, wherein the generally rounded outer circumference of each of the annular shoulders comprises curved annular sections extending between an exterior circumferential surface and the adjacent radial faces.*

*40. The rotor shaft of claim 39, wherein each of the curved sections in the area of the exterior circumferential surface has an axial dimension of between about 0.1 mm and about 0.5 mm.*

*41. The rotor shaft of claim 39, wherein each of the curved sections in the area of the exterior circumferential surface has an axial dimension of about 0.3 mm.*

*42. The rotor shaft of claim 34, wherein the generally rounded outer circumference of each of the annular shoulders comprises beveled annular sections extending between an exterior circumferential surface and the adjacent radial faces.*

*43. The rotor shaft of claim 34, wherein the rounded annular surfaces of each recess between the base circumference thereof and the radial faces of the adjacent annular shoulders have a dimension of between about 0.2 mm and about 1.5 mm.*

*44. The rotor shaft of claim 34, wherein the rounded annular surfaces of each recess between the base circumference thereof and the radial faces of the adjacent annular shoulders have a dimension of about 0.7 mm.*

*45. The rotor shaft of claim 34, wherein one radial face of one of the annular shoulders forms a terminal end of the rotor shaft.*

*46. The rotor shaft of claim 34, further comprising:*

*a mechanical emergency bearing in the end area of the rotor shaft, the emergency bearing having at least one bearing component made of a ceramic material.*

*47. The rotor shaft of claim 46, wherein the at least one bearing component comprises a ceramic pin.*

*48. The rotor shaft of claim 47, wherein the ceramic pin is fixed in a bore of a bearing bushing of the axial bearing.*

*49. The rotor shaft of claim 47, wherein the ceramic pin is fixed in a bore of the rotor shaft.*

*50. A rotor shaft for a spinning rotor of an open-end spinning frame, the rotor shaft comprising:*

*a rotating magnetic bearing component arranged at an end area of the rotor shaft, the rotating magnetic bearing component comprising at least two ferromagnetic annular shoulders defined by adjacent recesses in the rotor shaft, each annular shoulder having opposed radial faces and a generally rounded outer circumference extending therebetween, and each recess having a base circumference.*

*51. The rotor shaft of claim 50, wherein the ratio of the length of the rotor shaft to the diameter of the rotor shaft is less than about 12:1.*

*52. The rotor shaft of claim 50, wherein the ratio of the length of the rotor shaft to the diameter of the rotor shaft is about 11.33:1.*

*53. The rotor shaft of claim 50, wherein the rotor shaft has a length of less than about 100 mm.*

*54. The rotor shaft of claim 50, wherein the rotor shaft has a length of about 93.5 mm.*

*55. The rotor shaft of claim 50, wherein the generally rounded outer circumference of each of the annular shoulders comprises curved annular sections extending between an exterior circumferential surface and the adjacent radial faces.*

*56. The rotor shaft of claim 55, wherein each of the curved sections in the area of the exterior circumferential surface has an axial dimension of between about 0.1 mm and about 0.5 mm.*

*57. The rotor shaft of claim 55, wherein each of the curved sections in the area of the exterior circumferential surface has an axial dimension of about 0.3 mm.*

*58. The rotor shaft of claim 50, wherein the generally rounded outer circumference of each of the annular shoulders*

*comprises beveled annular sections extending between an exterior circumferential surface and the adjacent radial faces.*

*59. The rotor shaft of claim 50, wherein the rounded annular surfaces of each recess between the base circumference thereof and the radial faces of the adjacent annular shoulders have a dimension of between about 0.2 mm and about 1.5 mm.*

*60. The rotor shaft of claim 50, wherein the rounded annular surfaces of each recess between the base circumference thereof and the radial faces of the adjacent annular shoulders have a dimension of about 0.7 mm.*

*61. The rotor shaft of claim 50, wherein one radial face of one of the annular shoulders forms a terminal end of the rotor shaft.*

*62. The rotor shaft of claim 50, further comprising:*

*a mechanical emergency bearing in the end area of the rotor shaft, the emergency bearing having at least one bearing component made of a ceramic material.*

*63. The rotor shaft of claim 62, wherein the at least one bearing component comprises a ceramic pin.*

*64. The rotor shaft of claim 63, wherein the ceramic pin is fixed in a bore of a bearing bushing of the axial bearing.*

*65. The rotor shaft of claim 63, wherein the ceramic pin is fixed in a bore of the rotor shaft.*

* * * * *